US012261661B2

(12) United States Patent
Ding et al.

(10) Patent No.: US 12,261,661 B2
(45) Date of Patent: Mar. 25, 2025

(54) ANTENNA SWITCHING METHOD AND APPARATUS

(71) Applicant: HUAWEI TECHNOLOGIES CO., LTD., Guangdong (CN)

(72) Inventors: Rentian Ding, Shanghai (CN); Bao Zhang, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 165 days.

(21) Appl. No.: 17/912,670

(22) PCT Filed: Mar. 23, 2021

(86) PCT No.: PCT/CN2021/082228
§ 371 (c)(1),
(2) Date: Sep. 19, 2022

(87) PCT Pub. No.: WO2021/190463
PCT Pub. Date: Sep. 30, 2021

(65) Prior Publication Data
US 2023/0231602 A1    Jul. 20, 2023

(30) Foreign Application Priority Data
Mar. 25, 2020   (CN) .......................... 202010217166.4

(51) Int. Cl.
*H04B 7/06*   (2006.01)
*H04B 7/0404*   (2017.01)

(52) U.S. Cl.
CPC ......... *H04B 7/0602* (2013.01); *H04B 7/0404* (2013.01)

(58) Field of Classification Search
CPC .. H04B 7/0404; H04B 7/0602; H04B 7/0604; H04W 88/10; H04W 16/18
See application file for complete search history.

(56) References Cited

U.S. PATENT DOCUMENTS

| 2010/0069028 | A1* | 3/2010 | Choi ..................... H04B 7/061 455/136 |
| 2017/0264465 | A1 | 9/2017 | Lee et al. |
| 2017/0332370 | A1 | 11/2017 | Rico Alvarino et al. |
| 2021/0099205 | A1* | 4/2021 | Seyed ................. H04B 7/0602 |
| 2021/0219362 | A1* | 7/2021 | Lee ....................... H04W 76/15 |

(Continued)

FOREIGN PATENT DOCUMENTS

| CN | 109361444 A | 2/2019 |
| CN | 110149132 A | 8/2019 |
| CN | 110336577 A | 10/2019 |

(Continued)

OTHER PUBLICATIONS

Translated CN 109361444 A (Year: 2019).*

*Primary Examiner* — Siu M Lee

(57) ABSTRACT

This application provides a method for dynamically switching antennas. User equipment determines an antenna switching sequence based on a networking mode of the user equipment and an actual scenario, and performs antenna switching based on the determined antenna switching sequence. When the technical solutions of this application are implemented, a problem that a conflict exists in an antenna switching process is effectively resolved without adding hardware.

8 Claims, 7 Drawing Sheets

(56) References Cited

U.S. PATENT DOCUMENTS

2023/0083089 A1* 3/2023 Venkatachari ........ H04L 5/0048
375/267
2023/0147639 A1* 5/2023 Go .......................... H04W 8/24
455/101

FOREIGN PATENT DOCUMENTS

| CN | 110572178 A | 12/2019 |
|---|---|---|
| CN | 110768772 A | 2/2020 |
| CN | 110858976 A | 3/2020 |

* cited by examiner

ANTENNA SWITCHING METHOD AND APPARATUS

CROSS-REFERENCE TO RELATED APPLICATIONS

This application is a national phase application of International Application No. PCT/CN2021/082228, filed on Mar. 23, 2021, which claims priority to Chinese Patent Application No. 202010217166.4, filed on Mar. 25, 2020. Both of the aforementioned priority applications are hereby incorporated by reference in their entirety.

TECHNICAL FIELD

This application relates to the field of antenna technologies, and in particular, to an antenna switching technology.

BACKGROUND

In a long-term evolution (Long-Term Evolution, LTE) technology and a new radio (New Radio, NR) system, a sounding reference signal (Sounding Reference Signal, SRS) antenna switching technology, that is, so-called SRS antenna switching, is introduced into a time-division duplexing (Time-Division Duplexing, TDD) frequency band. To be specific, user equipment (User Equipment, UE) transmits SRS signals through different antennas, and a base station obtains channel estimation results of different antennas of the UE based on an uplink-downlink channel reciprocity principle of a TDD system, to calculate a weighted value that is most suitable for downlink receiving of the UE, and perform beamforming.

Currently, all 5G electronic devices support four antennas to receive data from a base station. For different networking modes, in a non-standalone (NSA) mode, only a single antenna is supported to transmit data to the base station, and in an SA mode, two antennas may be supported to transmit data to the base station. Currently, a size of an electronic device is limited, and a quantity of antennas is also limited. However, multi-mode simultaneous operation needs to be supported. For example, in an NSA scenario, LTE and NR operate at the same time. For another example, in a dual-card scenario, two of four antennas are occupied by LTE, which causes an inter-antenna conflict with SRS switching of NR.

SUMMARY

This application provides an embodiment of a method for performing dynamic antenna switching based on a different networking mode and a different scenario of user equipment.

According to a first aspect, this application provides an antenna switching method, including: User equipment UE determines a networking mode of the UE; the UE determines a current scenario of the UE based on the determined networking mode of the UE; the UE determines an antenna switching sequence based on the current scenario, where the antenna switching sequence includes a first switching sequence and a second switching sequence; and the UE performs antenna switching based on the antenna switching sequence.

Through implementation of the foregoing technical solution, an antenna conflict problem in various scenarios can be effectively resolved, thereby improving antenna throughput efficiency.

With reference to the first aspect, in a first possible implementation, that the UE determines an antenna switching sequence based on the current scenario includes: When the networking mode of the UE is a first networking mode, the UE determines a first antenna group and a second antenna group, where the first antenna group includes an antenna that is not occupied by a secondary card of the UE, and the second antenna group includes an antenna that is occupied by the secondary card of the UE; and the UE determines, based on the first antenna group, that the switching sequence is the first switching sequence.

With reference to the first possible implementation of the first aspect, in a second possible implementation, the UE includes N antennas, where N is a positive integer; the secondary card occupies M antennas, where M is a positive integer greater than or equal to 1 and less than or equal to N; and the first antenna group includes N-M antennas, and the second antenna group includes M antennas.

With reference to the second possible implementation of the first aspect, in a third possible implementation, when the first antenna group has no antenna, the UE stops performing antenna switching.

With reference to any one of the first possible implementation to the third possible implementation of the first aspect, in a fourth possible implementation, the first networking mode is non-standalone NSA networking.

With reference to the first aspect, in a fifth possible implementation, that the UE determines an antenna switching sequence based on the current scenario includes: When the networking mode of the UE is a second networking mode, the UE determines a third antenna group and a fourth antenna group, where the third antenna group includes an antenna that is not occupied by a secondary card of the UE, and the fourth antenna group includes an antenna that is occupied by the secondary card of the UE; and the UE determines, based on the first antenna group, that the switching sequence is the second switching sequence.

With reference to the fifth possible implementation of the first aspect, in a sixth possible implementation, the UE includes N antennas, where N is a positive integer; the UE selects Q antennas at one time for transmission; and the UE divides the N antennas into Q groups on average, and performs antenna switching on antennas of each group.

With reference to the sixth possible implementation of the first aspect, in a seventh possible implementation, if any antenna group in the Q antenna groups belongs to a third antenna group, normal switching is performed on antennas of any group; if an antenna that belongs to a fourth antenna group exists in any antenna group in the Q antenna groups, antenna switching is performed on an antenna that belongs to the third antenna group; and if antennas of any antenna group in the Q antenna groups all belong to the fourth antenna group, antenna switching is not performed on this antenna group.

With reference to any one of the fifth possible implementation to the seventh possible implementation of the first aspect, in an eighth possible implementation, the second networking mode is standalone SA networking.

According to a second aspect, an embodiment of this application provides user equipment UE, including N antennas, where N is a positive integer. The UE further includes a processor. The processor determines a networking mode of the UE; the processor determines a current scenario of the UE based on the determined networking mode of the UE; the processor determines an antenna switching sequence based on the current scenario, where the antenna switching sequence includes a first switching sequence and a second switching sequence; and antenna switching is performed on the N antennas based on the antenna switching sequence.

With reference to the second aspect, in a first possible implementation, that the processor determines the antenna switching sequence based on the current scenario includes: When the networking mode of the UE is a first networking mode, the processor determines a first antenna group and a second antenna group, where the first antenna group includes an antenna that is not occupied by a secondary card of the UE, and the second antenna group includes an antenna that is occupied by the secondary card of the UE; and the processor determines, based on the first antenna group, that the switching sequence is the first switching sequence.

With reference to the first possible implementation of the second aspect, in a second possible implementation, the secondary card occupies M antennas, where M is a positive integer greater than or equal to 1 and less than or equal to N; and the first antenna group includes N-M antennas, and the second antenna group includes M antennas.

With reference to the second possible implementation of the second aspect, in a third possible implementation, when the first antenna group has no antenna, the UE stops performing antenna switching.

With reference to the first possible implementation to the third possible implementation of the second aspect, in a fourth possible implementation, the first networking mode is non-standalone NSA networking.

With reference to the second aspect, in a fifth possible implementation, that the UE determines the antenna switching sequence based on the current scenario includes: When the networking mode of the UE is a second networking mode, the UE determines a third antenna group and a fourth antenna group, where the third antenna group includes an antenna that is not occupied by a secondary card of the UE, and the fourth antenna group includes an antenna that is occupied by the secondary card of the UE; and the UE determines, based on the first antenna group, that the switching sequence is the second switching sequence.

With reference to the fifth possible implementation of the second aspect, in a sixth possible implementation, the UE includes N antennas, where N is a positive integer; the UE selects Q antennas at one time for transmission; and the UE divides the N antennas into Q groups on average, and performs antenna switching on antennas of each group.

With reference to the sixth possible implementation of the second aspect, in a seventh possible implementation, if any antenna group in the Q antenna groups belongs to a third antenna group, normal switching is performed on antennas of any group; if an antenna that belongs to the fourth antenna group exists in any antenna group in the Q antenna groups, antenna switching is performed on an antenna that belongs to the third antenna group; and if antennas of any antenna group in the Q antenna groups all belong to the fourth antenna group, antenna switching is not performed on this antenna group.

With reference to any one of the fifth possible implementation to the seventh possible implementation of the second aspect, in an eighth possible implementation, the second networking mode is standalone SA networking.

Through implementation of the foregoing method, a conflict problem generated in antenna switching when the UE is in different networking modes or scenarios can be effectively resolved, so that antenna throughput is greatly improved.

DESCRIPTION OF EMBODIMENTS

Terms used in the following embodiments are merely intended to describe particular embodiments, but are not intended to limit this application. The terms "one", "a", "the", "the foregoing", "this", and "the one" of singular forms used in this specification and the appended claims of this application are also intended to include plural forms, unless otherwise specified in the context clearly. It should be further understood that the term "and/or" used in this application refers to any or all possible combinations that include one or more listed items.

This application provides an SRS dynamic switching method. To better understand this application, the following explains some key concepts used in this application. UE in this application may be understood as an electronic device. This is not limited in this application.

SRS: When a base station wants to obtain downlink information, only an uplink sounding signal transmitted by UE needs to be measured, so that the uplink sounding signal can be directly used. This reference signal used for uplink channel sounding is an SRS.

Figure 1A:
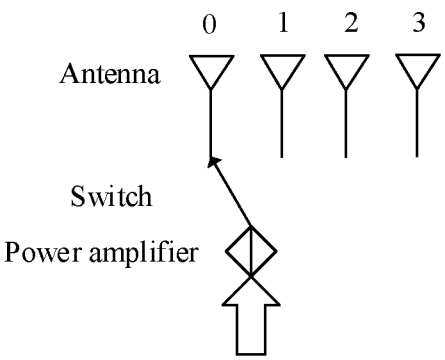
FIG. 1(a) is a schematic diagram of a 1T1R scenario according to this application.
Figure 1B:
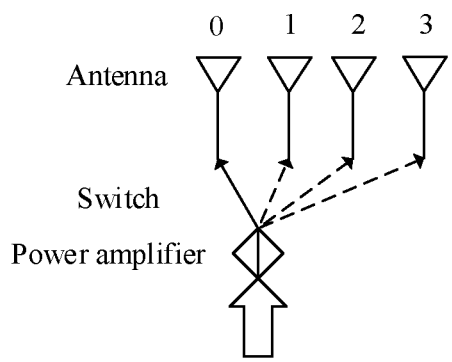
FIG. 1(b) is a schematic diagram of a 1T4R scenario according to this application.
Figure 1C:
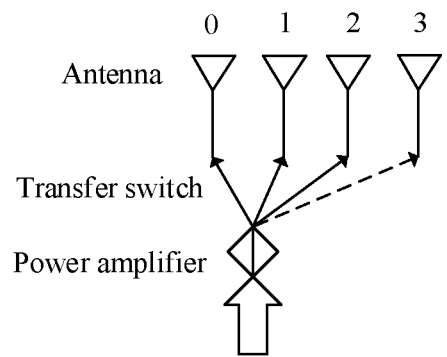
FIG. 1(c) is a schematic diagram of a 2T4R scenario according to this application.

An SRS antenna switching technology refers to making full use of a plurality of antennas of a 5G electronic device to alternately report channel information (that is, SRS antenna switching). This can enable a base station to obtain more comprehensive information and perform more accurate data transmission. FIG. 1(a) shows 1T1R in an NSA scenario. To be specific, SRS information is fed back to a base station on only one antenna, that is, SRS switching is not supported. As shown in FIG. 1(b), an electronic device is in a 1T4R scenario. To be specific, the electronic device alternately transmits SRS signals on four antennas, and selects one antenna for transmission each time. An electronic device that supports NSA usually uses this mode. As shown in FIG. 1(c), an electronic device is in a 2T4R scenario. To be specific, the electronic device alternately transmits SRS signals on four antennas, and selects two antennas for transmission each time. An electronic device that supports SA usually uses this mode. There are further 1T2R and the like. This is not limited in this application.

Figure 2:
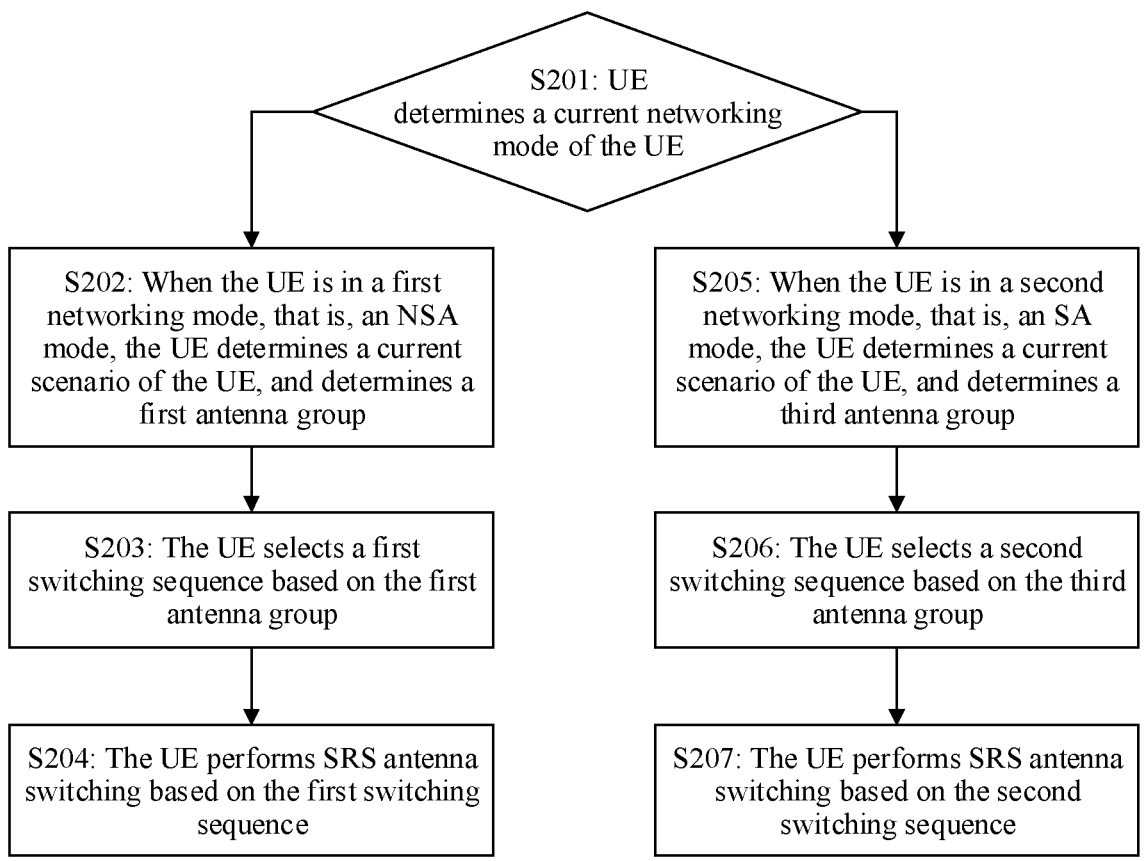
FIG. 2 is a flowchart of a dynamic antenna switching method according to this application.

FIG. 2 is a flowchart of a method for determining SRS dynamic switching by UE. It is assumed that the UE includes N antennas, and N is a positive integer. Details are as follows:

S201: The UE determines a current networking mode of the UE; and if the UE is in a first networking mode, go to a step S202; or if the UE is in a second networking mode, go to a step S205.

S202: When the UE is in the first networking mode, that is, an NSA mode, the UE determines a current scenario of the UE. The UE determines, based on the scenario of the UE, that a secondary card needs to occupy M antennas. The M antennas are considered as a second antenna group, where M is a positive integer greater than or equal to 1 and less than or equal to N. N-M antennas that are not occupied by the secondary card in the UE are considered as a first antenna group.

S203: The UE selects a first switching sequence based on the first antenna group.

S204: The UE performs SRS antenna switching based on the first switching sequence.

S205: When the UE is in the second networking mode, that is, an SA mode, the UE determines a current scenario of the UE. The UE selects, based on the scenario of the UE, Q antennas at one time for transmission. The antennas are divided into Q groups on average, and corresponding antenna switching is performed between antennas in each group. Currently, it is determined that a secondary card needs to occupy M antennas. The M antennas are considered as a fourth antenna group, where M is a positive integer greater than or equal to 1 and less than or equal to N. N-M antennas that are not occupied by the secondary card in the UE are considered as a third antenna group.

S206: The UE selects a second switching sequence based on the third antenna group. To be specific, if antennas in a same antenna group all belong to the third antenna group, normal switching is performed on the antennas; if an antenna that belongs to the fourth antenna group exists in a same antenna group, antenna switching is performed on an antenna that belongs to the third antenna group; and if antennas in a same antenna group all belong to the fourth antenna group, antenna switching is not performed on this antenna group.

S207: The UE performs SRS antenna switching based on the second switching sequence.

Figure 3A:
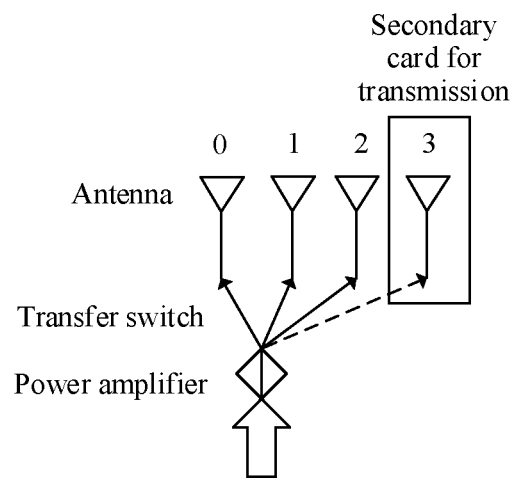
FIG. 3(a) is a schematic diagram of a 1T4R scenario in which a secondary card occupies one antenna according to this application.
Figure 3B:
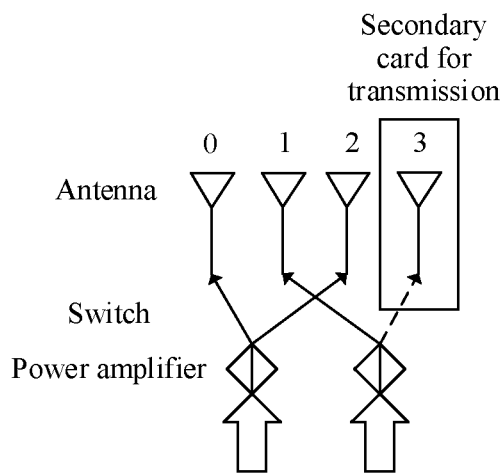
FIG. 3(b) is a schematic diagram of a 2T4R scenario in which a secondary card occupies one antenna according to this application.

FIG. 3(a) and FIG. 3(b) show an embodiment of an SRS dynamic switching method according to this application. The UE still reports a maximum SRS switching capability, and the secondary card or another mode occupies one antenna. For example, in a dual-card scenario, the secondary card performs only receiving, and for NR, SRS switching can be performed on only three antennas. FIG. 3(a) shows an NSA scenario, that is, 1T4R. Specifically, it is assumed that an antenna 3 is used by the secondary card for transmission in this case. In other words, the antenna 3 is occupied by the secondary card in this case. In other words, the antenna 3 belongs to the second antenna group. However, an antenna 0, an antenna 1, and an antenna 2 are not occupied by the secondary card. In this case, the antenna 0, the antenna 1, and the antenna 2 belong to the first antenna group. For details, refer to Table 1-1.

TABLE 1-1

| SRS switching sequence | Original switching sequence | Existing switching sequence |
| --- | --- | --- |
| 1T4R | 0 -> 1 -> 2 -> 3 | 0 -> 1 -> 2 -> y or 0 -> 1 -> 2 -> x (where x indicates no transmission, and y indicates any one of 0, 1, and 2) |

Specifically, the original switching sequence is from the antenna 0 to the antenna 3. In this case, when the antenna 3 is occupied and SRS switching is performed, a conflict occurs. According to the method proposed in this application, the UE determines the first antenna group and the second antenna group, where the first antenna group includes an antenna that is not occupied by the secondary card, and the second antenna group includes an antenna that is occupied by the secondary card; and the UE determines the first switching sequence based on the first antenna group. As shown in Table 1-1, the UE modifies, based on the first antenna group, a switching sequence to 0→1→2→y or 0→1→2→x (where x indicates no transmission, and y indicates any one of 0, 1, and 2), that is, the first switching sequence. The UE performs SRS switching based on the first switching sequence.

Specifically, when the secondary card occupies the antenna 2, the antenna 0, the antenna 1, and the antenna 3 belong to the first antenna group, and in this case, the antenna 2 belongs to the second antenna group. In this case, the UE modifies the first switching sequence to 0→1→3→y or 0→1→3→x based on the first antenna group, where x indicates no transmission, and y indicates any one of 0, 1, and 3.

As shown in FIG. 3(b), when the UE is in the second networking mode, the UE is in SA, that is, 2T4R. Specifically, it is assumed that an antenna 3 is used by the secondary card for transmission in this case. In other words, the antenna 3 is occupied by the secondary card in this case. In other words, the antenna 3 belongs to the second antenna group. However, an antenna 0, an antenna 1, and an antenna 2 are not occupied by the secondary card. In this case, the antenna 0, the antenna 1, and the antenna 2 belong to the first antenna group. For details, refer to Table 1-2.

TABLE 1-2

| SRS switching sequence | Original switching sequence | Existing switching sequence |
| --- | --- | --- |
| 2T4R | 0, 1 -> 2, 3 | 0, 1 -> 2, y or 0, 1 -> 2, x (where x indicates no transmission, and y indicates 1) |

Specifically, the original switching sequence is from the antenna 0 to the antenna 2, and from the antenna 1 to the antenna 3, that is, 0, 1→2, 3. When the antenna 3 is occupied and SRS switching is performed, a conflict occurs. According to the method proposed in this application, the UE determines the third antenna group and the fourth antenna group, where the third antenna group includes an antenna that is not occupied by the secondary card, and the fourth antenna group includes an antenna that is occupied by the secondary card; and the UE determines the second switching sequence based on the third antenna group. As shown in Table 1-2, the UE modifies, based on the third antenna group, a switching sequence to 0, 1→2, y or 0, 1→2, x (where x indicates no transmission, and y indicates 1), that is, the second switching sequence. The UE performs SRS switching based on the second switching sequence.

Specifically, when the secondary card occupies the antenna 2, the antenna 0, the antenna 1, and the antenna 3 belong to the first antenna group, and in this case, the antenna 2 belongs to the fourth antenna group. In this case, the UE modifies the second switching sequence to 0, 1→y, 3 or 0, 1→x, 3 (where x indicates no transmission, and y indicates 0) based on the third antenna group.

According to the foregoing method, it is ensured that the UE can still report a maximum switching capability. When the UE is in another mode or a card is idle or does not operate, the UE can still perform maximum switching to reach downlink peak throughput. When the secondary card occupies one antenna, SRS dynamic switching can still be performed on three antennas. In this way, downlink throughput experience of the UE is improved without increasing hardware costs and affecting operation of another mode or card. The foregoing embodiment is merely a specific case of this application. This is not limited in this application.

Figure 4A:
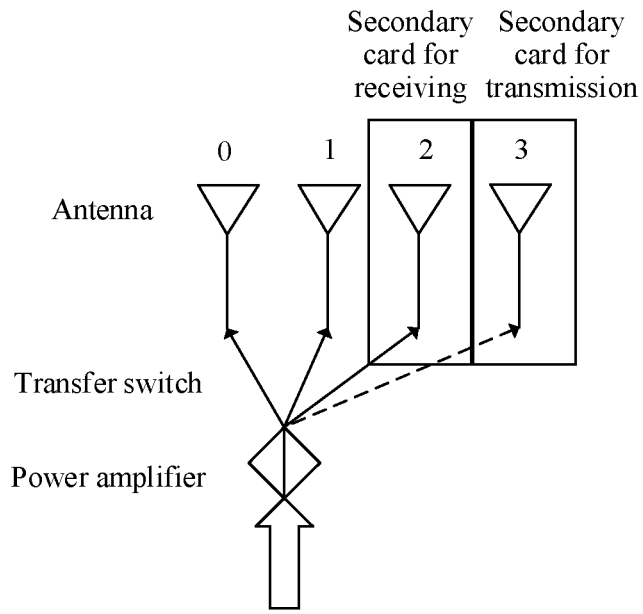
FIG. 4(a) is a schematic diagram of a 1T4R scenario in which a secondary card occupies two antennas according to this application.
Figure 4B:
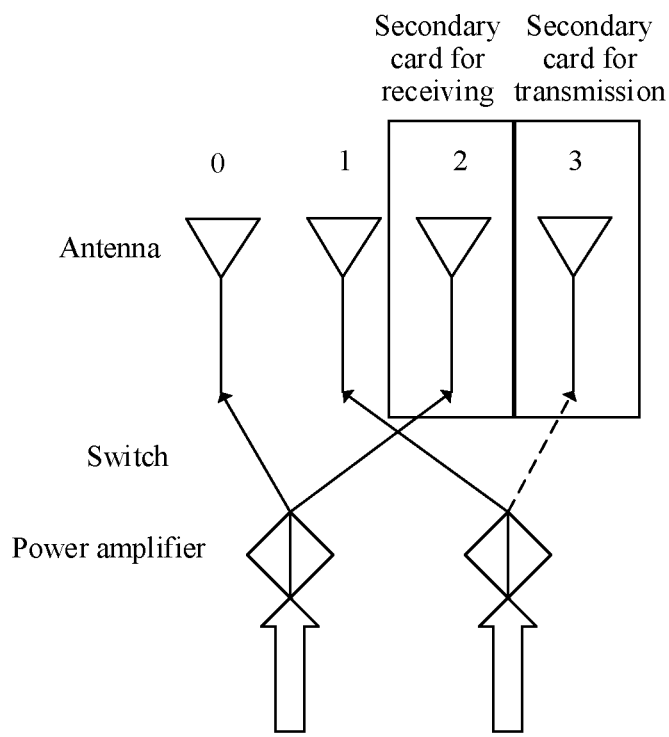
FIG. 4(b) is a schematic diagram of a 2T4R scenario in which a secondary card occupies two antennas according to this application.

Based on the foregoing implementation, FIG. 4(a) and FIG. 4(b) show an embodiment of another SRS dynamic switching method. The secondary card or another mode occupies only two antennas. For example, in a dual-card dual-pass scenario, the secondary card performs both receiving and transmission, different antennas are used for receiving and transmission, and SRS switching can be performed on two antennas of R. As shown in FIG. 4(a), when the UE is in the first networking mode, the UE is in an NSA scenario, that is, 1T4R. Specifically, it is assumed that an antenna 3 is used by the secondary card for transmission, and an antenna 2 is used by the secondary card for receiving in this case. In other words, the antenna 2 and the antenna 3 are occupied by the secondary card in this case. In other words, the antenna 2 and the antenna 3 belong to the second antenna group. However, an antenna 0 and an antenna 1 are not occupied by the secondary card. In this case, the antenna 0 and the antenna 1 belong to the first antenna group. The UE determines an SRS switching sequence based on the first antenna group. For details, refer to Table 1-3.

TABLE 1-3

| SRS switching sequence | Original switching sequence | Existing switching sequence |
| --- | --- | --- |
| 1T4R | 0 -> 1 -> 2 -> 3 | 0 -> 1 -> (x or y) -> (x or y) (where x indicates no transmission, and y indicates any one of 0 and 1) |

Specifically, when the secondary card occupies the antenna 2 and the antenna 3, the antenna 0 and the antenna 1 belong to the first antenna group, and in this case, the antenna 2 and the antenna 3 belong to the second antenna group. In this case, the UE modifies the first switching sequence to 0→1→(x or y)→(x or y) (where x indicates no transmission, and y indicates any one of 0 and 1) based on the first antenna group. That is, the UE performs switching between only the antenna 0 and the antenna 1.

As shown in FIG. 4(b), when the UE is in the second networking mode, the UE is in SA, that is, 2T4R. Specifically, it is assumed that an antenna 3 is used by the secondary card for transmission, and an antenna 2 is used by the secondary card for receiving in this case. In other words, the antenna 2 and the antenna 3 are occupied by the secondary card in this case. In other words, the antenna 2 and the antenna 3 belong to the third antenna group. However, an antenna 0 and an antenna 1 are not occupied by the secondary card. In this case, the antenna 0 and the antenna 1 belong to the fourth antenna group. The UE determines an SRS switching sequence based on the third antenna group. For details, refer to Table 1-4.

TABLE 1-4

| SRS switching sequence | Original switching sequence | Existing switching sequence |
| --- | --- | --- |
| 2T4R | 0, 1 -> 2, 3 | 0, 1 -> x, x or 0, 1 -> 0, 1 (where x indicates no transmission) |

Specifically, the original switching sequence is from the antenna 0 to the antenna 2, and from the antenna 1 to the antenna 3, that is, 0, 1→2, 3. When the antenna 3 is occupied and SRS switching is performed, a conflict occurs. According to the method proposed in this application, the UE determines the third antenna group and the fourth antenna group, where the third antenna group includes an antenna that is not occupied by the secondary card, and the fourth antenna group includes an antenna that is occupied by the secondary card; and the UE determines the second switching sequence based on the third antenna group. As shown in Table 1-3, the UE modifies, based on the third antenna group, a switching sequence to 0, x→1, x (where x indicates no transmission), that is, the second switching sequence. The UE performs SRS switching based on the second switching sequence. That is, the UE performs SRS switching on the antenna 0 and the antenna 1, and switching is not performed on the antenna 2 and the antenna 3.

Further, when the antenna 2 is used by the secondary card for receiving and the antenna 3 is used by the secondary card for transmission, the UE determines that the fourth antenna group includes the antenna 1 and the antenna 3, and in this case, the third antenna group includes the antenna 0 and the antenna 1. Then, the UE determines, based on the third antenna group, that a new switching sequence is 0, x→2, x, that is, switching is performed between the antenna 0 and the antenna 2, and switching is not performed between the antenna 1 and the antenna 3.

According to the foregoing method, it is ensured that the UE can still report a maximum switching capability. When the UE is in another mode or a card is idle or does not operate, the UE can still perform maximum switching to reach downlink peak throughput. When the secondary card occupies two antennas, SRS dynamic switching can still be performed on two antennas.

Figure 5A:
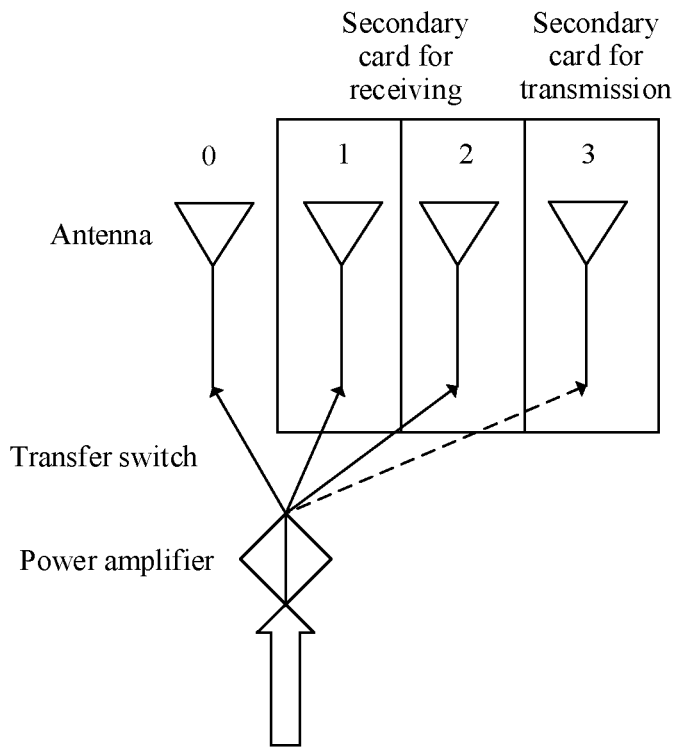
FIG. 5(a) is a schematic diagram of a 1T4R scenario in which a secondary card occupies three antennas according to this application.
Figure 5B:
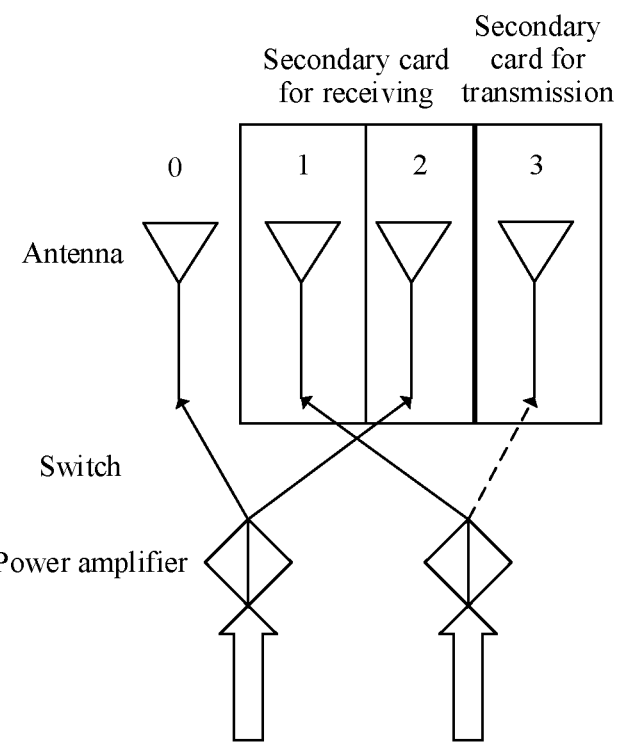
FIG. 5(b) is a schematic diagram of a 2T4R scenario in which a secondary card occupies three antennas according to this application.

Based on the foregoing implementation, FIG. 5(a) and FIG. 5(b) show an embodiment of another SRS dynamic switching method. The secondary card or another mode occupies only three antennas. For example, in a dual-card dual-pass scenario or in a special hardware solution design, the secondary card occupies one transmit antenna and two receive antennas, and different antennas are used for receiving and transmission. For NR, only one antenna can be used for SRS switching. As shown in FIG. 5(a), when the UE is in the first networking mode, the UE is in an NSA scenario, that is, 1T4R. Specifically, it is assumed that an antenna 3 is used by the secondary card for transmission, and an antenna 1 and an antenna 2 are used by the secondary card for receiving in this case. In other words, the antenna 1, the antenna 2, and the antenna 3 are occupied by the secondary card in this case. In other words, the antenna 1, the antenna 2, and the antenna 3 belong to the second antenna group. However, an antenna 0 is not occupied by the secondary card. In this case, the antenna 0 belongs to the first antenna group. The UE determines an SRS switching sequence based on the first antenna group. For details, refer to Table 1-5.

TABLE 1-5

| SRS switching sequence | Original switching sequence | Existing switching sequence |
|---|---|---|
| 1T4R | 0 -> 1 -> 2 -> 3 | 0 -> (0 or x) -> (0 or x) -> (0 or x), where x indicates no transmission |

Specifically, when the secondary card occupies the antenna 1, the antenna 2, and the antenna 3, the antenna 0 belongs to the first antenna group, and in this case, the antenna 1, the antenna 2, and the antenna 3 belong to the second antenna group. In this case, the UE modifies the first switching sequence to 0→(0 or x)→(0 or x)→(0 or x) based on the first antenna group, where x indicates no transmission. That is, the UE performs switching on only the antenna 0.

As shown in FIG. 5(b), when the UE is in the second networking mode, the UE is in SA, that is, 2T4R. Specifically, it is assumed that an antenna 3 is used by the secondary card for transmission, and an antenna 1 and an antenna 2 are used by the secondary card for receiving in this case. In other words, the antenna 1, the antenna 2, and the antenna 3 are occupied by the secondary card in this case. In other words, the antenna 1, the antenna 2, and the antenna 3 belong to the fourth antenna group. However, an antenna 0 is not occupied by the secondary card. In this case, the antenna 0 belongs to the third antenna group. The UE determines an SRS switching sequence based on the third antenna group. For details, refer to Table 1-6.

TABLE 1-6

| SRS switching sequence | Original switching sequence | Existing switching sequence |
|---|---|---|
| 2T4R | 0, 1 -> 2, 3 | 0, x -> 0, x (where x indicates no transmission) |

Specifically, the original switching sequence is from the antenna 0 to the antenna 2, and from the antenna 1 to the antenna 3, that is, 0, 1→2, 3. When the antenna 3 is occupied and SRS switching is performed, a conflict occurs. According to the method proposed in this application, the UE determines the third antenna group and the fourth antenna group, where the third antenna group includes an antenna that is not occupied by the secondary card, and the fourth antenna group includes an antenna that is occupied by the secondary card; and the UE determines the second switching sequence based on the third antenna group. As shown in Table 1-6, the UE modifies, based on the third antenna group, a switching sequence to 0, x→0, x (where x indicates no transmission), that is, the second switching sequence. The UE performs SRS switching based on the second switching sequence. That is, the UE performs SRS switching on the antenna 0, and switching is not performed on the antenna 1, the antenna 2, and the antenna 3.

Figure 6A:
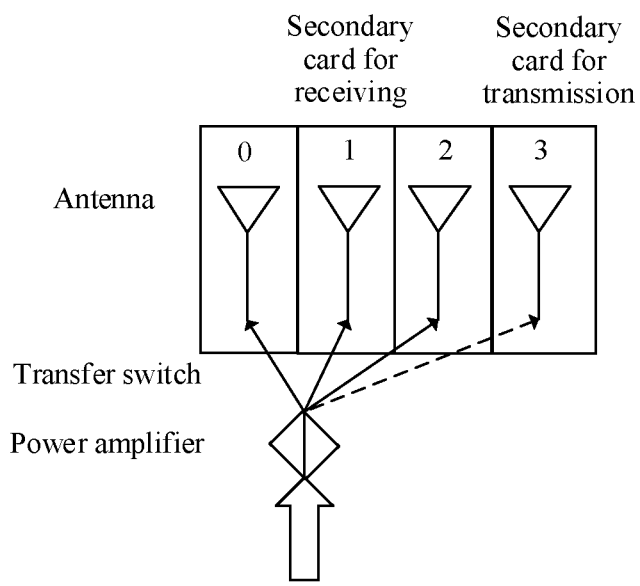
FIG. 6(a) is a schematic diagram of a 1T4R scenario in which a secondary card occupies four antennas according to this application.
Figure 6B:
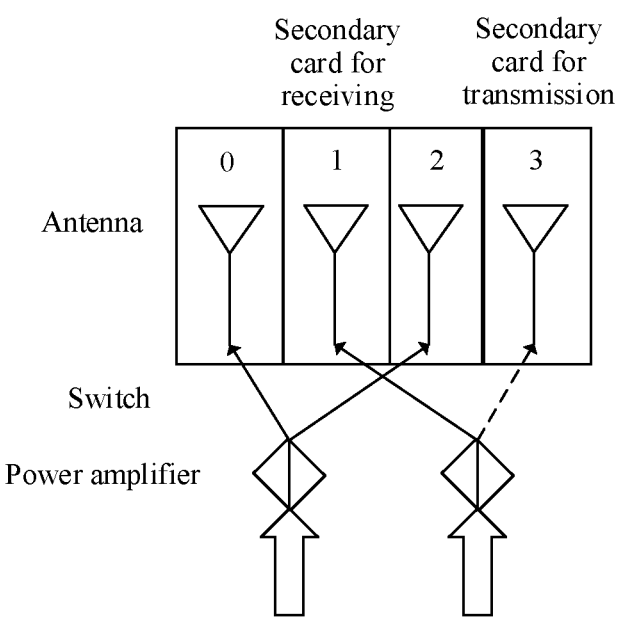
FIG. 6(b) is a schematic diagram of a 2T4R scenario in which a secondary card occupies four antennas according to this application.

Based on the foregoing implementation, FIG. 6(a) and FIG. 6(b) show an embodiment of another SRS dynamic switching method. The secondary card or another mode occupies four antennas. For example, in a dual-card time-division multiplexing scenario, the secondary card occupies all antennas; and a primary card temporarily does not operate. In this case, for NR, there is no antenna used for transmission. As shown in FIG. 6(a), when the UE is in the first networking mode, the UE is in an NSA scenario, that is, 1T4R. Specifically, it is assumed that an antenna 3 is used by the secondary card for transmission, and an antenna 0, an antenna 1, and an antenna 2 are used by the secondary card for receiving in this case. In other words, the antenna 0, the antenna 1, the antenna 2, and the antenna 3 are occupied by the secondary card in this case. In other words, the antenna 0, the antenna 1, the antenna 2, and the antenna 3 belong to the second antenna group, and the first antenna group has no antenna. The UE determines an SRS switching sequence based on the first antenna group. For details, refer to Table 1-7.

TABLE 1-7

| SRS switching sequence | Original switching sequence | Existing switching sequence |
|---|---|---|
| 1T4R | 0 -> 1 -> 2 -> 3 | x -> x -> x -> x, where x indicates no transmission |

Specifically, when the secondary card occupies the antenna 0, the antenna 1, the antenna 2, and the antenna 3, the first antenna group has no antenna. In this case, the second antenna group includes the antenna 0, the antenna 1, the antenna 2, and the antenna 3. In this case, the UE modifies the first switching sequence to x→x→x→x based on the first antenna group, where x indicates no transmission. That is, the UE does not perform SRS switching.

As shown in FIG. 6(b), when the UE is in the second networking mode, the UE is in SA, that is, 2T4R. Specifically, it is assumed that an antenna 3 is used by the secondary card for transmission, and an antenna 0, an antenna 1, and an antenna 2 are used by the secondary card for receiving in this case. In other words, the antenna 0, the antenna 1, the antenna 2, and the antenna 3 are occupied by the secondary card in this case. In other words, the antenna 0, the antenna 1, the antenna 2, and the antenna 3 belong to the fourth antenna group, and the third antenna group has no antenna. The UE determines an SRS switching sequence based on the third antenna group. For details, refer to Table 1-8.

TABLE 1-8

| SRS switching sequence | Original switching sequence | Existing switching sequence |
|---|---|---|
| 2T4R | 0, 1 -> 2, 3 | x, x -> x, x (where x indicates no transmission) |

Specifically, when the secondary card occupies the antenna 0, the antenna 1, the antenna 2, and the antenna 3, the first antenna group has no antenna. In this case, the second antenna group includes the antenna 0, the antenna 1, the antenna 2, and the antenna 3. In this case, the UE modifies the first switching sequence to x→x→x→x based on the first antenna group, where x indicates no transmission. That is, the UE does not perform SRS switching.

According to the foregoing embodiment, the UE still reports a maximum switching capability. When the UE is in another mode or a card is idle or does not operate, the UE can still perform maximum switching to reach downlink peak throughput. When the secondary card occupies four antennas, switching is not performed on the antennas.

Figure 7:
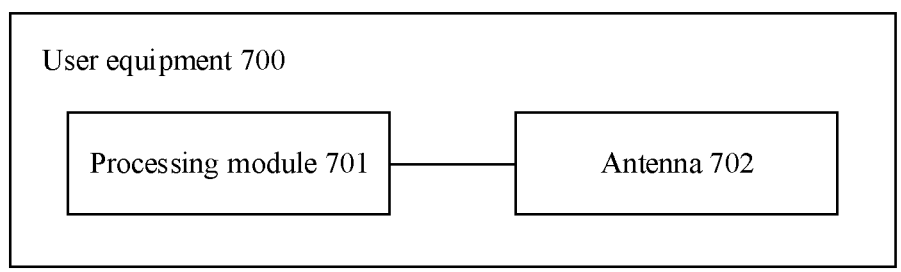
FIG. 7 is a schematic diagram of a structure of user equipment according to this application.

FIG. 7 is a schematic diagram of UE according to this application. As shown in FIG. 7, user equipment 700 includes a processing module 701 and an antenna 702. The processing module 701 is configured to determine a current networking mode of the UE, and determine an antenna switching sequence based on the current networking mode and an actual scenario. The antenna 702 performs dynamic switching based on the determined switching sequence. For a specific method, refer to FIG. 2. Details are not described herein again.

Figure 8:
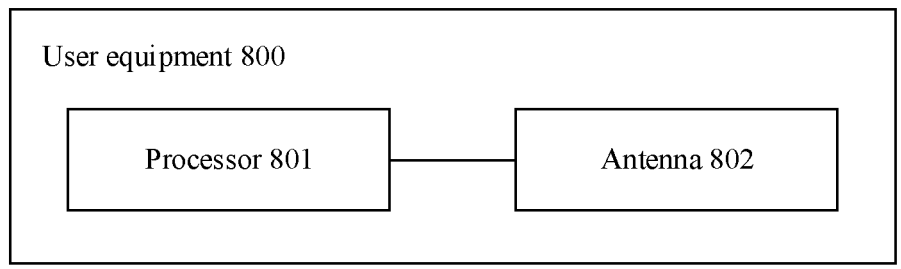
FIG. 8 is a schematic diagram of a structure of another user equipment according to this application.

FIG. 8 is a schematic diagram of UE according to this application. As shown in FIG. 8, user equipment 700 includes a processor 801 and an antenna 802. The processor 801 is configured to determine a current networking mode of the UE, and determine an antenna switching sequence based on the current networking mode and an actual scenario. The antenna 802 performs dynamic switching based on the determined switching sequence. For a specific method, refer to FIG. 2. Details are not described herein again.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An antenna switching method performed by user equipment (UE), comprising:
   reporting to a base station that N antennas are available to the UE for performing sounding reference signal (SRS) antenna switching in a new radio (NR) mode for sending sounding reference signals (SRSs) to the base station, wherein N is a number of total operative antennas of the UE, and the UE operates in both the NR mode and a long-term evolution (LTE) mode;
   obtaining an original SRS antenna switching sequence for the SRS antenna switching in the NR mode, wherein the original SRS antenna switching sequence is set based on all N antennas of the UE being available for the SRS antenna switching; and
   detecting that a first antenna in a target next antenna set in the original SRS antenna switching sequence is unavailable due to being currently occupied by the LTE mode;
   in response to detecting that the first antenna is unavailable for SRS antenna switching, switching to a tentative antenna set for SRS transmission to the base station, wherein the tentative antenna set either replaces the first antenna with a second antenna that is not occupied by the LTE mode, or omits transmission of an SRS originally to be transmitted by the first antenna according to the original SRS antenna switching sequence.

2. The method according to claim 1, wherein the LTE mode occupies M antennas, and N-M antennas are not occupied by LTE mode, wherein the second antenna is selected from the N-M antennas.

3. The method according to claim 1, wherein the NR mode is non-standalone (NSA) networking, and the target next antenna set in the original SRS antenna switching sequence comprises only the first antenna.

4. The method according to claim 1, wherein the NR mode is standalone (SA) networking, and the target next antenna set in the original SRS antenna switching sequence comprises multiple antennas including the first antenna.

5. User equipment (UE) comprising:
   N antennas;
   a memory storing executable instructions; and
   a processor configured to execute the executable instructions to perform operations of:
   reporting to a base station that all of the N antennas are available to the UE in a new radio (NR) mode for performing sounding reference signal (SRS) antenna switching for transmitting sounding reference signals (SRSs) to the base station, wherein the UE operates in both the NR mode and a long-term evolution (LTE) mode;
   obtaining an original SRS antenna switching sequence for the SRS antenna switching in the NR mode, wherein the original SRS antenna switching is set based on all N antennas of the UE being available for the SRS antenna switching; and
   detecting that a first antenna in a target next antenna set in the original SRS antenna switching sequence is unavailable due to being currently occupied by the LTE mode;
   in response to detecting that the first antenna is unavailable for SRS antenna switching, switching to a tentative antenna set for SRS transmission to the base station, wherein the tentative antenna set either replaces the first antenna with a second antenna that is not occupied by the LTE mode, or omits transmission of an SRS originally to be transmitted by the first antenna according to the original SRS antenna switching sequence.

6. The UE according to claim 5, wherein the LTE mode occupies M antennas, and N-M antennas are not occupied by the LTE mode, wherein the second antenna is selected from the N-M antennas.

7. The UE according to claim 5, wherein the first networking mode is non-standalone (NSA networking), and the target next antenna set in the original SRS antenna switching sequence comprises only the first antenna.

8. The UE according to claim 5, wherein the second networking mode is standalone (SA) networking, and the target next antenna set in the original SRS antenna switching sequence comprises multiple antennas including the first antenna.

\* \* \* \* \*